US009869793B2

(12) United States Patent
Zhang et al.

(10) Patent No.: US 9,869,793 B2
(45) Date of Patent: Jan. 16, 2018

(54) MULTIBAND COMMON-OPTICAL-PATH IMAGE-SPECTRUM ASSOCIATED REMOTE SENSING MEASUREMENT SYSTEM AND METHOD

(71) Applicant: HUAZHONG UNIVERSITY OF SCIENCE AND TECHNOLOGY, Wuhan, Hubei (CN)

(72) Inventors: Tianxu Zhang, Hubei (CN); Xiaobing Dai, Hubei (CN); Xiangyan Liu, Hubei (CN); Jianfei Ji, Hubei (CN); Xudong He, Hubei (CN); Pengcheng Gao, Hubei (CN)

(73) Assignee: Huazhong University of Science and Technology, Wuhan, Hubei (CN)

(*) Notice: Subject to any disclaimer, the term of this patent is extended or adjusted under 35 U.S.C. 154(b) by 0 days.

(21) Appl. No.: 15/108,175

(22) PCT Filed: Sep. 2, 2014

(86) PCT No.: PCT/CN2014/085762
§ 371 (c)(1),
(2) Date: Jun. 24, 2016

(87) PCT Pub. No.: WO2015/101062
PCT Pub. Date: Jul. 9, 2015

(65) Prior Publication Data
US 2016/0327682 A1  Nov. 10, 2016

(30) Foreign Application Priority Data
Dec. 30, 2013 (CN) .......................... 2013 1 0750061

(51) Int. Cl.
*G01V 8/10* (2006.01)
*G01J 3/02* (2006.01)
(Continued)

(52) U.S. Cl.
CPC .............. *G01V 8/10* (2013.01); *G01J 3/0208* (2013.01); *G01J 3/453* (2013.01); *G01J 2003/2826* (2013.01)

(58) Field of Classification Search
CPC .. G01J 3/453; G01J 3/0208; G01J 2003/2826; G01V 8/10
(Continued)

(56) References Cited

U.S. PATENT DOCUMENTS 6,781,127 B1    8/2004   Wolff et al.
2013/0277560 A1  10/2013  Robinson

FOREIGN PATENT DOCUMENTS

CN    1604139    4/2005
CN    101702021  5/2010
(Continued)

OTHER PUBLICATIONS

International Search Report for international application No. PCT/CN2014/085762, dated Nov. 26, 2014 (4 pages, including English translation).

*Primary Examiner* — Daniel L Murphy
(74) *Attorney, Agent, or Firm* — Hamre, Schumann, Mueller & Larson, P.C.

(57) ABSTRACT

The present invention relates to a multiband common-optical-path image-spectrum associated remote sensing measurement system and method. The system includes an infrared window (1), a two-dimensional rotating mirror (2), a planar reflector (3), a reflective multiband infrared lens system (4), a Fourier interference spectrum module (5), an image-spectrum associated processing module (6), a power supply module (7), a refrigerating module (8), and a display module (9); the incident light enters from the infrared window (1), is reflected by the two-dimensional rotating mirror (2), and then is reflected by the planar reflector (3) to the reflective multiband infrared lens system (4) and then is
(Continued)

split by a spectroscope (42); the transmitted light is focused by means of a convergent lens and is imaged on an infrared detector (43); the reflected light is focused on an infrared optical fiber coupler (44) and enters the Fourier interference spectrum module (5) through an infrared optical fiber to form an interference pattern, and further, spectrum data is obtained through Fourier transformation; the image-spectrum associated processing module (6) effectively combines broadband spectrum imaging and non-imaging spectrum data, and controls the two-dimensional rotating mirror (2) to point to a target, thereby implementing intelligent remote sensing measurement. The present invention has capabilities of performing local scene region spectrum measurement and multi-target tracking spectrum measurement, has high speed, an appropriate data amount, and low cost.

7 Claims, 5 Drawing Sheets

(51) Int. Cl.
*G01J 3/453* (2006.01)
*G01J 3/28* (2006.01)

(58) Field of Classification Search
USPC .......................................................... 356/5.01
See application file for complete search history.

(56) References Cited

FOREIGN PATENT DOCUMENTS

| | | |
|---|---|---|
| CN | 102564589 | 7/2012 |
| CN | 102651124 | 8/2012 |
| CN | 103776540 | 5/2014 |

MULTIBAND COMMON-OPTICAL-PATH IMAGE-SPECTRUM ASSOCIATED REMOTE SENSING MEASUREMENT SYSTEM AND METHOD

TECHNICAL FIELD

The present invention belongs to the field of remote sensing measurement technology, and in particular, to a multiband common-optical-path image-spectrum associated remote sensing measurement system and method.

BACKGROUND ART

In accordance with the structure and property of an electromagnetic spectrum, the infrared information of a target refers to the difference between the target and the background in terms of radiation, reflection, and scattering characteristics acquired by an infrared spectral band sensor, which includes radiation, reflection, and scattering characteristics of each fine spectrum (line) band of short-wave, medium-wave, and long-wave infrared. Compared with the target/background information of a single spectral band, the information of multiple fine spectral bands can represent more comprehensively and accurately the characteristics inherent in the target and the background. A conventional detection method generally uses a single spectral band imaging and detecting method to collect the energy of the target/background on a wide spectral band. At this time, this target is often drowned in a complex background clutter or interfered, the signal is very weak, and the signal to noise ratio and the signal to clutter ratio are very low.

An image-spectrum associated device combines the infrared spectrum of the target and infrared imaging information, and by utilizing a unique spectrum feature of the target on a spectral line of the infrared spectrum, the detectability of the target can be greatly enhanced. The technology has been widely applied in the field of remote sensing for studying the spectrum features of various targets and backgrounds, thereby providing a data basis for the classification and monitoring of scenes, as well as the detection and identification of the target.

Great importance has been attached to the study and development of such an image-spectrum associated device around the world. At present, the commonly used image-spectrum associated device is an imaging spectrometer. This type of imaging spectrometer is usually installed on an aircraft, of which a scanning rotating mirror rotates, such that the received instantaneous field of view moves perpendicular to the flight direction, thereby realizing the scanning. Along with the forward movement of the aircraft, the imaging spectrometer completes the two-dimensional scanning, ground object scenes are scanned point by point, and point-by-point measurement is performed at individual wavebands, so that multi-spectrum remote sensing image information is obtained. For example, the AVIPIS system completed by the American JPL Lab, the GERIS system of the American GER company, and the PHI push-broom imaging spectrometer system studied by Shanghai Institute of Technical Physics of Chinese Academy of Sciences. This type of system can provide abundant two-dimensional space information and third-dimensional spectrum data, that is, the spectrum information can be extracted at each point of the two-dimensional space imaging. However, this type of device extracts image cube data of a target scene, which has a very large information processing amount and a low spatial resolution, is suitable for measuring a stationary target but uneasy to cope with a moving target, and has a high price which can be hardly accepted by users.

In many practical applications, it is unnecessary to acquire spectrums of stationary ground objects and sky background in real time, while spectral characteristics needs to be utilized to automatically perform detecting identification and exploring identification in real time on a moving target (a time-varying object) or a local region in the scene, such as an aircraft in the air, a ship on the sea, a moving vehicle, fire, or explosion.

In the relevant patents, "Image-spectrum integrated Method and Device for Acquisition of Spectrum Information of Time-varying Object" (ZL200910272679.9) and "Multi-waveband Spectral Characteristic Detection Identification Method and Device for Moving Object" (ZL201110430969.9) applied by Huazhong University of Science and Technology in China, which have been authorized, adopt a mode of combining two lenses to realize image spectrum association, which has a large device volume; a planar infrared window is adopted, which has a small field of view; and the measurement method is directed to a single moving target, which has no intelligent automatic control strategy to guide the process of remote sensing measurement.

With respect to the above automatic detection and spectrum identification on multiple moving targets and time-varying objects, the spectrum imaging device commonly used recently has the following disadvantages: (1) being not applicable to the spectrum measurement in a local region in a scene; (2) failing to realize the automatic tracking spectrum measurement on multiple moving targets; (3) being unable to perform online processing and identification on the target spectrum; and (4) having a large data processing amount, a low speed, and a high price.

SUMMARY

With respect to the above defects or improvement requirements of the prior art, the present invention provides a multiband common-optical-path image-spectrum associated remote sensing measurement system and method, the objective of which is to achieve multiband common-optical-axis image-spectrum associated measurement for a moving target or a local region, thereby solving the technical problem in detection and identification on a weak target or a moving target.

The present invention provides a multiband common-optical-path image-spectrum associated remote sensing measurement system, wrapped by a protective shell, wherein the system includes an infrared window, a two-dimensional rotating mirror, a planar reflector, a reflective multiband infrared lens system, a Fourier interference spectrum module, an image-spectrum associated processing module, a power supply module, a refrigerating module, and a display module; the infrared window is connected to the shell, through which the infrared light in a target scene passes; the two-dimensional rotating mirror is fixedly installed inside the shell, a center of the two-dimensional rotating mirror coincides with a central axis of a field of view of the infrared window, a mirror plane of the two-dimensional rotating mirror is placed to form an angle of 45° with the central axis of the field of view of the infrared window, for tracking a moving target in a target scene, and realizing local-region and multi-target sampling; the center of the planar reflector and the center of the two-dimensional rotating mirror are on the same horizontal height, and the mirror plane of the planar reflector is parallel to the mirror plane of the two-dimensional rotating mirror; the central axis of the reflective multiband infrared lens system coincides with the center of the planar reflector, for focusing the multiband infrared light, and realizing imaging and spectrum measurement in a common optical path; an optical signal input end of the Fourier interference spectrum module is connected to the reflective multiband infrared lens system, an electrical signal output end of the Fourier interference spectrum module is connected to the image-spectrum associated processing module, for acquiring infrared spectrum data; the image-spectrum associated processing module is connected to the reflective multiband infrared lens system, for realizing image-spectrum associated processing; and the power supply module, the refrigerating module, and the display module are respectively connected to the image-spectrum associated processing module.

Wherein, the two-dimensional rotating mirror includes a planar reflector, a two-dimensional turntable, and a servo motor; the planar reflector is placed on the two-dimensional turntable, and is fixed through a card slot on the turntable; two drive shafts of the servo motor are mechanically connected to a pitching axis and a rotation axis of the two-dimensional turntable respectively.

Wherein, the reflective multiband infrared lens system includes a lens body, a spectroscope, an infrared detector, and an infrared optical fiber coupler; the center of the mirror plane of the spectroscope coincides with the central axis of the lens body, the mirror plane of the spectroscope forms an angle of 45° with the central axis; the infrared detector is mounted at the tail, the center of the infrared detector and the central axis are arranged in a straight line; and the infrared optical fiber coupler is disposed at the edge of the tail.

Wherein, the image-spectrum associated processing module includes a communication level switch unit, an image processing unit, a system control unit, a spectrum processing unit, and a data merging total control unit; the communication level switch unit is connected to the infrared detector in the reflective multiband infrared lens system via an RS422 interface, for realizing level switch between modules; one end of the image processing unit is connected to the infrared detector via an image interface, the other end of the image processing unit is connected to the data merging total control unit, for performing image enhancement, feature extraction, segmentation processing on the collected infrared image, and realizing system tracking; an input end of the system control unit is connected to the communication level switch unit, a control end of the system control unit is connected to the data merging total control unit, an output end of the system control unit is connected to the two-dimensional rotating mirror, for performing motion control on the two-dimensional rotating mirror via a serial port; the input end of the spectrum processing unit is connected to an electrical signal output end of the Fourier interference spectrum module, the output end of the spectrum processing unit is connected to the data merging total control unit, for performing collection control, data preprocessing, radiometric calibration, and spectrum feature extraction processing on the infrared spectrum collected by the Fourier interference spectrum module; and the data merging total control unit is configured to perform data merging processing on the output of the image processing unit, the system control unit, and the spectrum processing unit, and select an optimal system control strategy for performing data collection according to the processing result.

The present invention further provides a measurement method based on the above multiband common-optical-path image-spectrum associated remote sensing measurement system, which includes the following steps:

(1) achieving full-field of view scanning collection in a target scene by an infrared detector to obtain an image sequence;

(2) extracting at least one region of interest in the image sequence;

(3) calculating a feature description matrix of all regions of interest in the image sequence;

(4) judging whether the current time is in a data acquisition initial stage, if so, giving an initial value to the feature weight matrix of all the regions of interest; and if not, performing successive matching correlation between all the regions of interest in the image sequence and all the regions of interest acquired in the previous collection period according to the feature description matrix of all the regions of interest, extracting a spectrum feature of each region of interest correlated successfully, adding the spectrum feature into the feature description matrix of the corresponding region of interest, and meanwhile duplicating the feature weight matrix thereof to the feature weight matrix of the corresponding regions of interest;

(5) calculating a feature information entropy of all the regions of interest, sorting the corresponding regions of interest according to the values of the feature information entropy ranging from large to small, and give serial numbers of a collection sequence to all the regions of interest;

(6) sorting collection points in all the regions of interest in sequence according to the serial numbers so as to form a collection point sequence;

(7) sequentially moving an optical axis point to the collection points in the collection point sequence; meanwhile using a non-imaging Fourier interference spectrum module to acquire spectrum data of the regions of interest; and (8) repeating steps (1) to (7) to go on with the next collection period, until the system collection is over.

Wherein, in the step (2), the region of interest refers to several closely connected pixel points in an image, and the extracting the region of interest specifically includes:

(21) performing image enhancement processing by means of a non-linear visual principle;

(22) performing image segmentation processing on the image on which the enhancement processing has been performed; and (23) performing dilation and erosion processing on the image on which the segmentation processing has been performed so as to obtain the regions of interest.

Wherein, in the step (3), the feature description matrix of the regions of interest includes a position feature, a shape feature, a gray feature, and a spectrum feature; the position feature includes a collection point coordinate $$\left( x_c = \frac{\sum_{i=1}^{M} x_i}{M}, y_c = \frac{\sum_{i=1}^{M} y_i}{M} \right),$$

a boundary chain $(c_1, c_2, \ldots c_n)$, and a collection distance $L=|x_c-x_0|+|y_c-y_0|$; the region of interest $RGN_V$ includes M pixel points $(x_1,y_1), (x_2,y_2), \ldots, (y_M,y_M)$, n is the number of pixel points at the boundary of the region of interest, $c_i=(x_i,y_i)$ is the pixel point at the boundary of the region of interest; and $(x_0,y_0)$ is a current optical axis point, and the position thereof is constantly changed along with the movement of the two-dimensional rotating mirror;

the shape feature includes an area A and a perimeter $P=|\partial(RGN_V)|$ of the region of interest; wherein the area $A=M$, and the perimeter P is equal to the length of the region of interest $RGN_V$;

The gray feature includes an average gray $$I = \frac{\sum_{i=1}^{M} f(x_i, y_i)}{M},$$

a gray gradient matrix, and an average gradient; wherein the $f(x_i,y_i)$ represents a gray value of the image at the pixel point $(x_i,y_i)$; and the spectrum feature includes a spectrum curve change trend, positions of wave peaks and wave troughs, the number of wave peaks greater than a mean value, the number of wave peaks less than the mean value, the number of wave troughs greater than the mean value, the number of wave troughs less than the mean value, a peak width, and a peak height.

In general, as compared with the prior art, in the above technical solution designed by the present invention, the infrared window uses a spherical structure, which can increase the field of view of the system measurement, and reduce the blind angle of measurement; the two-dimensional rotating mirror uses a servo motor, which can realize flexible switching of the field of view and quick target tracking; the reflective multiband infrared mirror can realize the common optical path of imaging and spectrum measurement; and the image-spectrum associated processing adopts an optimum automatic control strategy, which is capable of enabling the system to realize time-space-spectrum multi-dimensional sparse sampling on the target scene, reducing the data amount, and realizing the maximum measurement value.

BRIEF DESCRIPTION OF THE DRAWINGS

FIG. 8 is a data result measured by tracking a civil aircraft in the air in real time during an outfield experiment of the present invention; wherein FIG. 8-1 is a long-wave image of the civil aircraft in the air; clockwise, the measured distances are 1 km, 2.5 km, 5 km, and 8 km in sequence; FIG. 8-2 is infrared spectrum data of the civil aircraft in the air; clockwise, the measured distances are 1 km, 2.5 km, 5 km, and 8 km in sequence;

wherein, 1—infrared window, 2—two-dimensional rotating mirror, 21—planar reflector, 22—two-dimensional turntable, 23—servo motor, 3—planar reflector, 4—reflective multiband infrared lens system, 41—Cassegrain structure, 411—parabolic reflector, 412—hyperboloidal reflector, 42—spectroscope, 43—infrared detector, 44—infrared optical fiber coupler, 5—Fourier interference spectrum module, 51—beam splitter, 52—fixed mirror, 53—moving mirror, 54—unit detector, 6—spectrum information merging module, 61—communication level switch unit, 62—image processing unit, 63—system control unit, 64—spectrum processing unit, 65—data merging total control unit, 7—power supply module, 8—refrigerating module, and 9—display module.

DETAILED DESCRIPTION

To describe the objectives, technical solutions, and advantages of the present invention more clearly and understandable, the following makes a further detailed description on the present invention with reference to the accompanying drawings and embodiments. It should be understood that embodiment described herein are merely used to explain the present invention, but is not intended to limit the present invention. In addition, technical features involved in each implementation solution of the present invention described in the following, as long as they do not constitute a conflict with each other, can be combined with each other.

The present invention relates to a multiband common-optical-path image-spectrum associated remote sensing measurement system and an infrared image-spectrum associated collection method based on the system, and in particular, to a measurement system and method for an infrared image and an spectrum of a moving target. The present invention is a smart on-site remote sensing device, which is portable.

Figure 1:
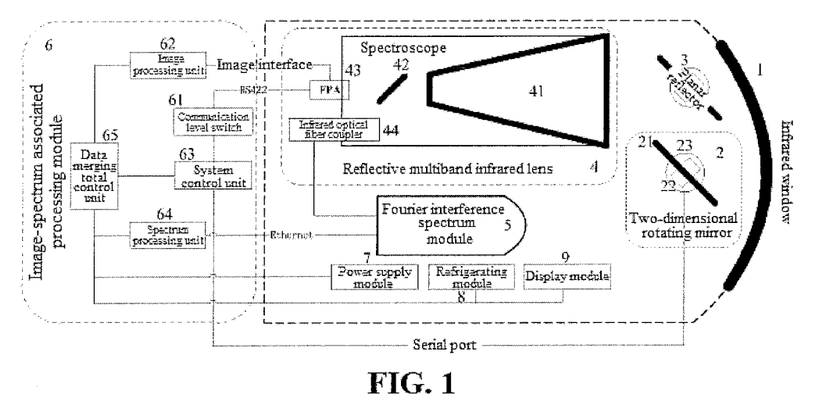
FIG. 1 is a schematic view of a modular structure of a multiband common-optical-path image-spectrum associated remote sensing measurement system according to the embodiments of the present invention.
Figure 2:
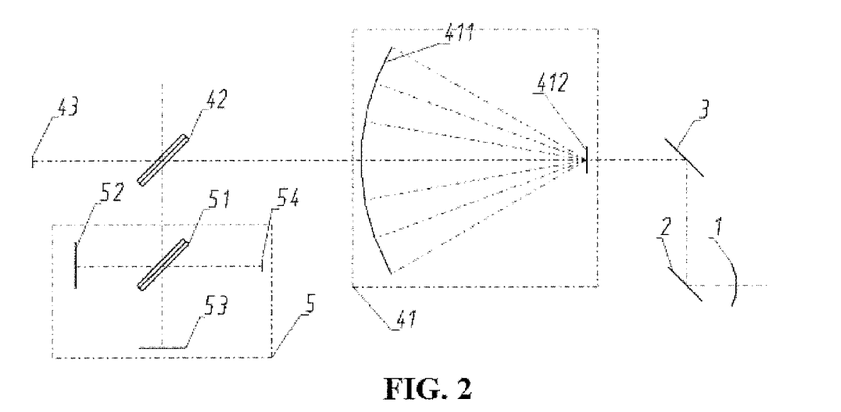
FIG. 2 is a schematic view of an optical path structure of the multiband common-optical-path image-spectrum associated remote sensing measurement system according to the embodiments of the present invention.

The present invention provides a multiband common-optical-path image-spectrum associated remote sensing measurement system, with reference to FIG. 1 and FIG. 2, the system mainly includes an infrared window 1, a two-dimensional rotating mirror 2, a planar reflector 3, a reflective multiband infrared lens system 4, a Fourier interference spectrum module 5, an image-spectrum associated processing module 6, a power supply module 7, a refrigerating module 8, and a display module 9; and the system is mainly divided into a processor entity and an optical measurement entity in terms of the physical structure. Wherein, the processor entity is composed of an image-spectrum associated processing module 6, and other parts compose the optical measurement entity. The former mainly implements all the information processing work of the system, and the latter implements the optical measurement work of the whole system.

The processor entity performs connection control over the Fourier interference spectrum module 5 by using an Ethernet interface, and acquires infrared spectrum data; a serial bus is used to implement the motion control over the two-dimensional rotating mirror 2; and an RS422 interface and an image interface are used to connect to the reflective multiband infrared lens system 4. The RS422 interface realizes level switch, controls the focusing and non-uniformity correction of a lens, the image interface includes an analog PAL system and a digital Camera LINK interface, for realizing the acquisition of the infrared image information.

The optical measurement entity is wrapped by a specially designed protective shell, and the shell is made of an aluminum alloy material. The infrared window 1 is connected to the shell by means of rivets; the two-dimensional rotating mirror 2 is fixedly installed inside the shell, the center thereof coincides with the central axis of the field of view of the infrared window 1, and the mirror plane is placed to form an angle of 45° with the central axis; the center of the planar reflector 3 and the center of the two-dimensional rotating mirror 2 are on the same horizontal height, the mirror plane of the planar reflector 3 is placed parallel to the mirror plane of the two-dimensional rotating mirror 2 and fixed inside the shell; the reflective multiband infrared lens system 4 adopts an athermalizing closed design, the central axis of the lens coincides with the center of the planar reflector 3, and the lens body is firmly fixed inside the shell: the Fourier interference spectrum module 5 is connected to the reflective multiband infrared lens system 4 via an infrared optical fiber; a power supply module 7 is placed in the internal space of the shell for supplying power to the system, and a universal power supply interface is provided to facilitate the use of an external power supply; the refrigerating module 8, which adopts a grid structure, and is placed inside the shell, for realizing temperature control over the shell, and meanwhile, a desiccant filling port is set, for facilitating adding a colorless silica gel or the like at any time; and the display module 9 uses a touch-control LCD screen, and is embedded into the side of the shell.

The infrared window 1 is configured to allow the infrared light in the target scene to pass through and filter other stray light, and meanwhile the infrared window 1 can also realize the isolation of the internal of the system from the outside, thereby playing a protecting role. In practical applications, the infrared window 1 is connected to the shell of the multiband common-optical-path image-spectrum associated remote sensing measurement system through a fixing structure.

The infrared window 1 may be made of a multi-spectrum CVD ZnS material. The multi-spectrum ZnS material under a CVD process has a high transmittance in near-infrared, short-wave infrared, medium-wave infrared, and long-wave infrared wavebands.

As an embodiment of the present invention, the infrared window 1, under the circumstance that the window size of the infrared window 1 is fixed, may adopt a spherical structure, which can increase the visible field of view of the system window, and narrow the detection blind angle of the system.

Figure 3:
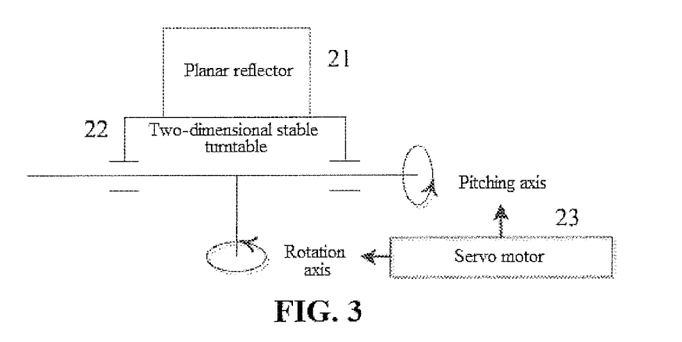
FIG. 3 is a schematic structural view of a two-dimensional rotating mirror of the multiband common-optical-path image-spectrum associated remote sensing measurement system according to the embodiments of the present invention.

As shown in FIG. 3, the two-dimensional rotating mirror 2 provided in the embodiments of the present invention includes a planar reflector 21, a two-dimensional turntable 22, and a servo motor 23. The planar reflector 21 is placed on the two-dimensional turntable 22, and is fixed through a card slot on the turntable; two drive shafts of the servo motor 23 are mechanically connected to a pitching axis and a rotation axis of the two-dimensional turntable 22 respectively. The planar reflector 21 may adopt a K9 glass, and after being plated with a gold reflective layer, has a high reflectivity for the short-wave, medium-wave, and long-wave infrared light; the two-dimensional turntable 22, being driven by the servo motor 23, may drive the planar reflector 21 to implement motion in two dimensions including rotation and pitching, so as to increase the detection flexibility of the system, and realize local-region sparse sampling.

The reflective multiband infrared lens system 4 includes: a Cassegrain structure 41, a spectroscope 42, an infrared detector 43, and an infrared optical fiber coupler 44; wherein, the Cassegrain structure 41 is a major structure of the reflective multiband infrared lens system, and the central axis coincides with the central axis of the lens; the center of the mirror plane of the spectroscope 42 coincides with the central axis of the Cassegrain structure 41, and the mirror plane is placed to form an angle of 45° with the central axis; the infrared detector 43 is installed at the tail of the lens, the center and the central axis of the lens are arranged in a straight line; and the infrared optical fiber coupler is installed at an appropriate position at the edge of the tail of the lens.

The Cassegrain structure 41 is composed of a parabolic reflector 411 and a hyperboloidal reflector 412, and the aberration is corrected by several lenses.

Light, after entering the reflective multiband infrared lens system 4, firstly enters the Cassegrain structure 41 to be focused, and then is split by the spectroscope 42, wherein the transmitted part is converged onto the infrared detector 43 to be imaged, and the reflected part is converged onto the infrared optical fiber coupler 44, and is transmitted to the Fourier interference spectrum module 5 via the optical fiber.

The reflective multiband infrared lens system 4 may realize that long-wave infrared imaging and short-wave, medium-wave, and long-wave infrared spectrum measurement are in a common optical path, and the centers of the two fields of view coincide with each other. The lens system has a less energy loss and a light overall weight, and implements athermalization for reducing the impact of the radiation of the lens itself on the detection. Wherein, two layers of antireflective coating are coated on the spectroscope 42 to enable it to have a high reflectivity for the short-wave and medium-wave infrared light, and to have a semi-reflecting and semi-transmitting function on the long-wave infrared light, and such a design has advantages including a simple structure, and no need for moving parts.

The Fourier interference spectrum module 5 is used to perform interference sampling on the incident light, and acquires an infrared spectrum through Fourier transformation: the embodiments of the present invention may adopt the spectrum detection unit EM27 or process control spectrum measurement system IRCube OEM of the Bruker Optics company in Germany, which both adopt a Michelson interferometer system, having a spectrum resolution selectable from 2 $cm^{-1}$, 4 $cm^{-1}$, 8 $cm^{-1}$, 16 $cm^{-1}$, and 32 $cm^{-1}$, a spectrum measurement range including short wave, medium wave, and long wave, and employing a Sterling or liquid nitrogen refrigerated MCT detector.

The image-spectrum associated processing module 6 includes a communication level switch unit 61, an image processing unit 62, a system control unit 63, a spectrum processing unit 64, and a data merging total control unit 65. Wherein, the communication level switch unit 61 is interconnected with the outside via the RS422 interface, for mainly realizing the level switch function between modules; the image processing unit 62 mainly performs image enhancement, feature extraction, segmentation, and other processing on the acquired infrared image, for realizing system tracking; the system control unit 63 performs motion control over a high speed servo-driven motor 23 via a serial port; the spectrum processing unit 64 mainly performs, via the Ethernet interface, collection control, data preprocessing, radiometric calibration, spectrum feature extraction, and other processing on the infrared spectrum collected by the Fourier interference spectrum module 5. The processing result of the three modules are all finally fed back to the data merging total control unit 65, for data merging processing, and an optimal system control strategy is eventually chosen for data collection. Meanwhile, the data merging total control unit 65 also interacts with the power supply module 7, the refrigerating module 8, and the display module 9, for realizing configuration parameterization, data visualization, and other functions.

The working principle of the present invention is: the light of the target scene is incident from the infrared window 1, reflected by the mirror plane of the planar reflector 21 of the two-dimensional rotating mirror 2, reflected again by the planar reflector 3 to enter the reflective multiband infrared lens system 4, and split by the spectroscope 42 after being focused by the Cassegrain structure 41 in the lens, wherein 50% of the long-wave infrared light in the incident light arrives at the infrared detector 43 for imaging after passing through the spectroscope 42; the short-wave and medium-wave infrared light and the other 50% of the long-wave infrared light in the incident light, after being reflected by the spectroscope, is transmitted to the Fourier interference spectrum module 5 via the infrared optical fiber coupler 44 by means of the optical fiber so as to form an interference pattern, and to finally obtain the infrared spectrum. The spectrum information merging module 6 receives, processes, and stores spectrum multidimensional information of the detection object through each sub-unit, and changes the pointing direction of the optical axis of the system by controlling the rotation of the two-dimensional rotating mirror 2, thereby further realizing the tracking and identification of the target. The display module 9 uses data acquired by the spectrum information merging module to display the spectrum information acquired by the current system in the form of a graphical interface, and achieves a simple human-computer interaction function.

Figure 4:
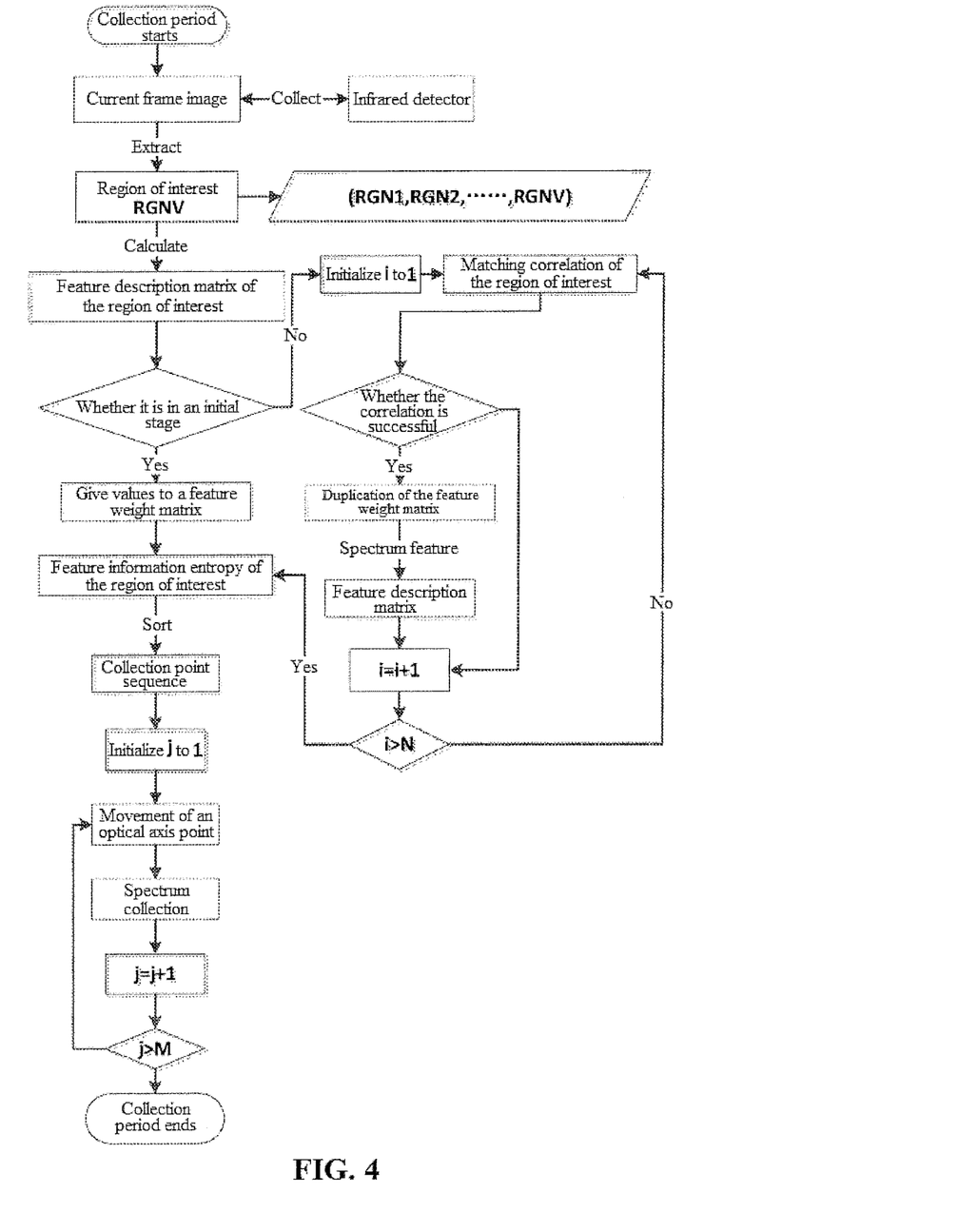
FIG. 4 is a flow chart of the implementation of a multiband common-optical-path image-spectrum associated remote sensing measurement method according to the embodiments of the present invention.
Figure 5:
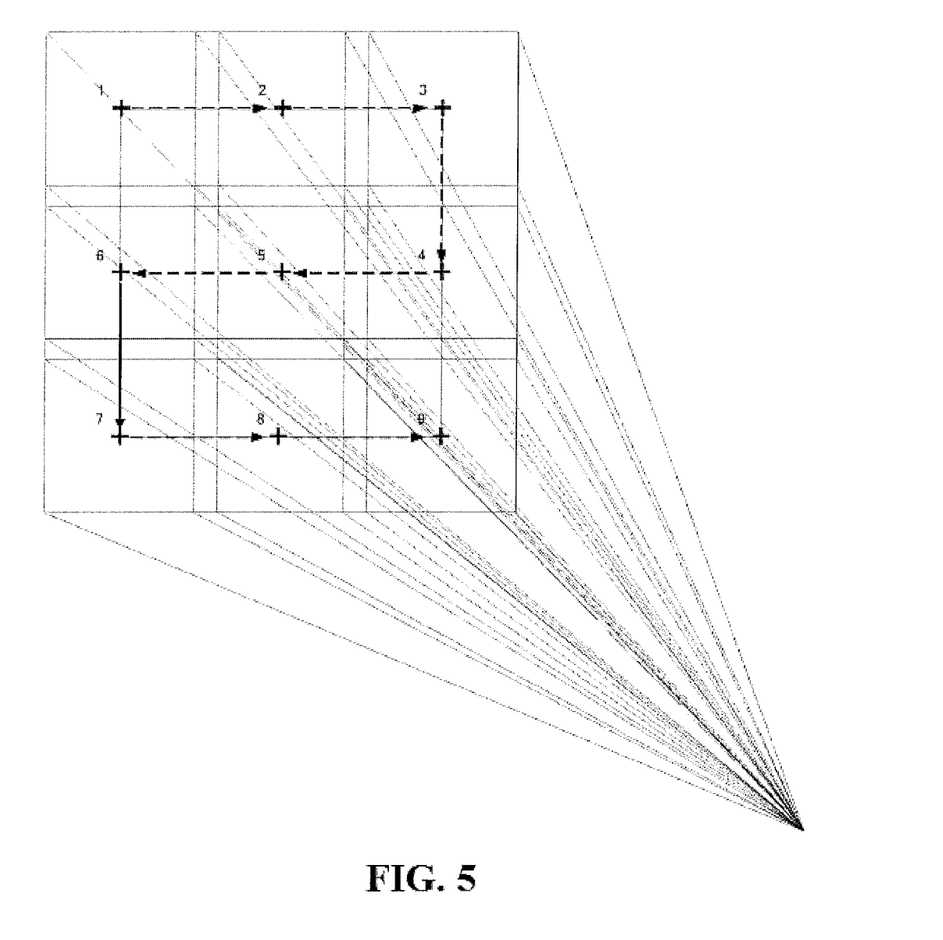
FIG. 5 is a schematic view of full-field of view scanning of the multiband common-optical-path image-spectrum associated remote sensing measurement system according to the embodiments of the present invention.

The present invention proposes a measurement method based on the above multiband common-optical-path image-spectrum associated remote sensing measurement system, with reference to FIG. 4, which includes the following steps:

(1) achieving full-field of view scanning collection (as shown in FIG. 5) in a target scene by an infrared detector;

(2) extracting at least one region of interest in the full-field of view scanning image sequence;

(3) calculating a feature description matrix of all regions of interest in the image sequence;

(4) judging whether the current time is in a data acquisition initial stage, if so, giving an initial value to the feature weight matrix of all the regions of interest; and if not, performing successive matching correlation between all the regions of interest in the image sequence and all the regions of interest acquired in the previous collection period according to the feature description matrix of all the regions of interest, extracting a spectrum feature of each region of interest correlated successfully, adding the spectrum feature into the feature description matrix of the corresponding regions of interest, and meanwhile duplicating the feature weight matrix thereof to the feature weight matrix of the corresponding regions of interest;

(5) calculating a feature information entropy of all the regions of interest, sorting the corresponding regions of interest according to the values of the feature information entropy ranging from large to small, and give serial numbers of a collection sequence of all the regions of interest;

(6) sorting collection points in all the regions of interest in sequence according to the serial numbers so as to form a collection point sequence;

(7) sequentially moving an optical axis point to the collection points in the collection point sequence; meanwhile using a non-imaging Fourier interference spectrum module to acquire spectrum data of the regions of interest; and (8) repeating steps (1) to (7) to start the next collection period, until the system collection is over.

In the multiband common-optical-path image-spectrum associated remote sensing measurement method proposed in the present invention, the region of interest in the step (2) refers to several closely connected pixel points in the image, and the extraction method is determined according to the following manner:

(21) performing image enhancement processing by means of a non-linear visual principle; wherein the objective of the image enhancement processing is to highlight a potential target and the region where the target is located;

(22) performing image segmentation processing on the image on which the enhancement processing has been performed; wherein a threshold segmentation method can be used to perform the image segmentation processing;

(23) performing dilation and erosion processing on the image on which the segmentation processing has been performed so as to acquire the region of interest; wherein the dilation and erosion processing is to merge individual residual pixel points to eliminate the interference factor.

In the multiband common-optical-path image-spectrum associated remote sensing measurement method proposed in the present invention, the feature description matrix of the region of interest in the step (3) includes a position feature, a shape feature, a gray feature, and a spectrum feature.

The region of interest $RGN_v$ is set to contain M pixel points $(x_1,y_1), (x_2,y_2), \ldots, (y_M,y_M)$, so the feature description matrix includes:

(31) the position feature includes a collection point coordinate $$\left(x_c = \frac{\sum_{i=1}^{M} x_i}{M}, y_c = \frac{\sum_{i=1}^{M} y_i}{M}\right);$$

a boundary chain $(c_1, c_2, \ldots c_n)$, where n is the number of boundary pixel points of the region of interest, $c_i=(x_i,y_i)$ is the boundary pixel point of the region of interest; the collection distance is $L=|x_c-x_0|+|y_c-y_0|$, wherein $(x_0,y_0)$ is the current optical axis point, and the position thereof constantly changes over the movement of the two-dimensional rotating mirror;

(32) the shape feature includes an area $A=M$ of the region of interest; a perimeter $P=|\partial(RGN_v)|$, which is a length of the region of interest $RGN_v$, wherein, in the process of calculating the perimeter, the distance between two 4-neighboring pixel points is defined as 1, and the distance between two 8-neighboring pixel points is defined as 1.414; and a shape number $$F = \frac{P^2}{4\pi A};$$

(33) the gray feature includes an average gray $$I = \frac{\sum_{i=1}^{M} f(x_i, y_i)}{M},$$

a gray gradient matrix, and an average gradient; wherein the $f(x_i,y_i)$ represents a gray value of the image at the pixel point $(x_i,y_i)$; and (34) the spectrum feature includes a spectrum curve change trend, positions of wave peaks (the maximum value) and wave troughs (the minimum value), the number of wave peaks greater than the average value, the number of wave peaks less than the average value, the number of wave troughs greater than the average value, the number of wave troughs less than the average value, a peak width, and a peak height; a Gaussian scale-space theory is used to calculate inflection points and curvatures of the spectrum curve in each Gaussian space scale, and the spectrum curve change trend is extracted through the inflection points and curvatures.

In the multiband common-optical-path image-spectrum associated remote sensing measurement method proposed in the present invention, the feature weight matrix in the step (4) is used to describe the contribution degree of the feature in the matching correlation and the information entropy. The design principle of the feature weight matrix is as follows:

(41) locating near the boundary of the pointing range of the center of the optical axis, including the region of interest of the moving target out of the positive boundary, and the weight level Level=5;

(42) locating inside the pointing range of the optical axis, including the region of interest of the moving target in the positive boundary, and the weight level Level=4;

(43) including the region of interest of the target moving towards the inner side of the pointing range of the optical axis, and the weight level Level=3;

(44) including the region of interest of the stationary target, and the weight level Level=2;

(45) not including the region of interest of the target, and the weight level Level=1;

(46) the regions of interest having the same weight level contribute weight components according to each sub-feature thereof in the feature matrix.

The matching correlation can be implemented by means of a related distance matching calculation method according to the feature description matrix and the feature weight matrix.

Herein, the position feature is matched by using a minimum distance; the shape and gray features adopt an SAD (Sum of Absolute Difference) method; and the spectrum feature adopts a SAM (spectral angle mapper) method.

In the multiband common-optical-path image-spectrum associated remote sensing measurement method proposed in the present invention, the feature information entropy in the step (5) is mainly used to describe the total amount of the feature information covered by the region of interest, and is a standard for determining the value of collecting the region of interest by the system.

Assuming that the N regions of interest $RGN_V$ within the current collection period are 1, 2, 3, . . . , and n in sequence, the feature description matrix is T, the feature weight matrix is W, and the feature information entropy (S) is defined as:

$$S = \sum_{i=1}^{N} T_i W_i$$

The multiband common-optical-path image-spectrum associated remote sensing measurement system and method of the present invention not only effectively realize the combined collection of the image and the spectrum information, but also realize the capturing of an intelligent target according to an automatic control strategy of a maximum information entropy through the above steps, and ultimately realize the multidimensional information measurement of the target.

Some targets have spatial sparsity, thus merely occupying a limited spatial region in the scene. The present invention utilizes long-wave infrared imaging to automatically detect, capture, and track the region of interest, and acquires spatial form, motion, and spectrum multi-dimensional information after automatically aligning the optical axis of the system with the tracked region of interest, thereby preferably handling the problems in spectrum measurement in a local region.

Figure 6:
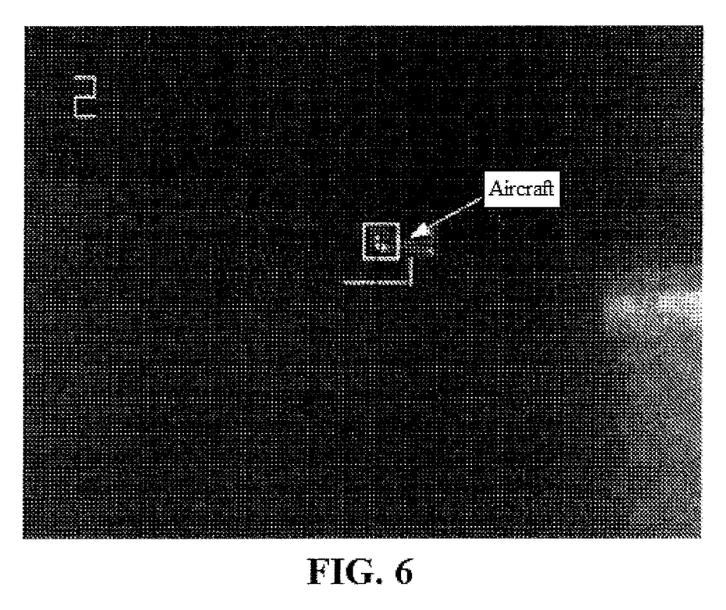
FIG. 6 is a flying aircraft captured in a sparse sky background according to the present invention.

As shown in FIG. 6, in the sparse sky background, the target of an aircraft is prominent, and the nozzle of the aircraft engine, due to a high temperature, is at the most prominent position relative to the whole region of interest of the aircraft, so that the spectrum information is the most strongly prominent, and the information entropy of the target is the maximum. In the present invention, the space sparse sampling-capturing is performed on the aircraft in the air according to the automatic control strategy in which the information entropy is optimized, then the real-time spectrum measurement is performed on the captured aircraft, and it can be clearly seen from the figure that the center of the optical axis is aligned with the position of the nozzle of the engine.

Multiple targets in a complex background maneuver in a limited restricted space. The present invention acquires the infrared image and uses the continuously measured infrared spectrum to perform automatic target detection and tracking. According to the automatic control strategy in which the feature information entropy is optimized, the measurement of the multiple targets is sorted, so as to realize the spectrum measurement of the multiple targets.

Figure 7:
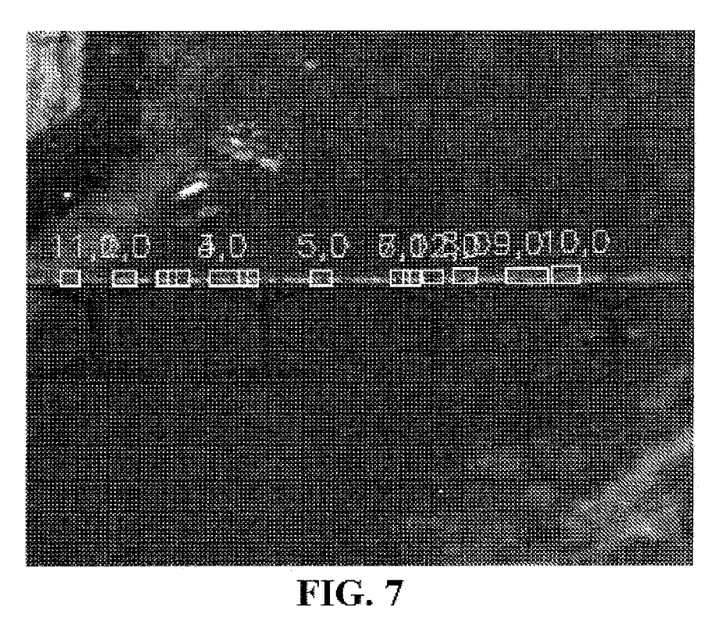
FIG. 7 is a maneuvering fleet captured under the constraint of bridge space according to the present invention.

As shown in FIG. 7, taking a fleet traveling on a bridge as an example, in a space range, a bridge landmark constraint region decides the space range detected for the maneuvering fleet.

Figure 81:
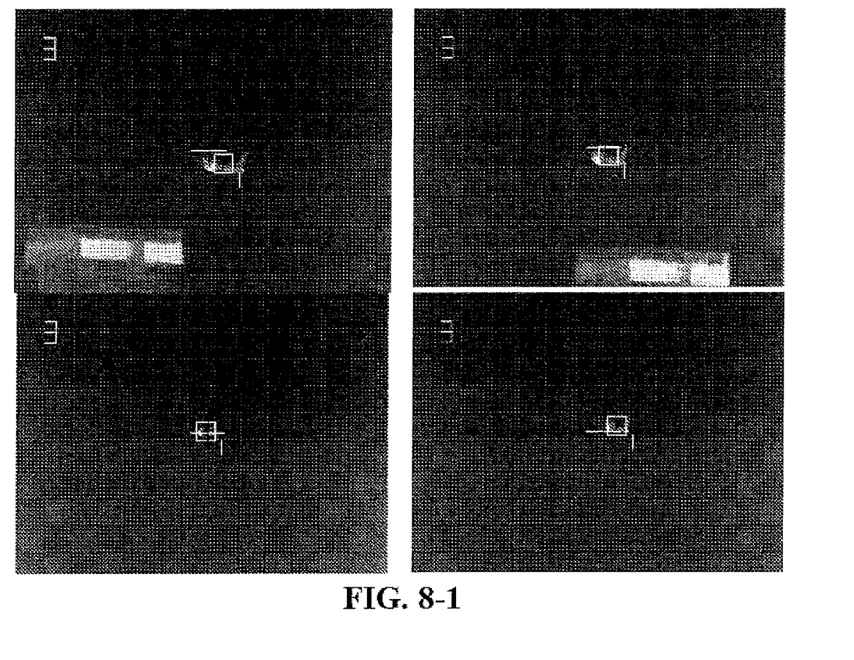
Figure 82:
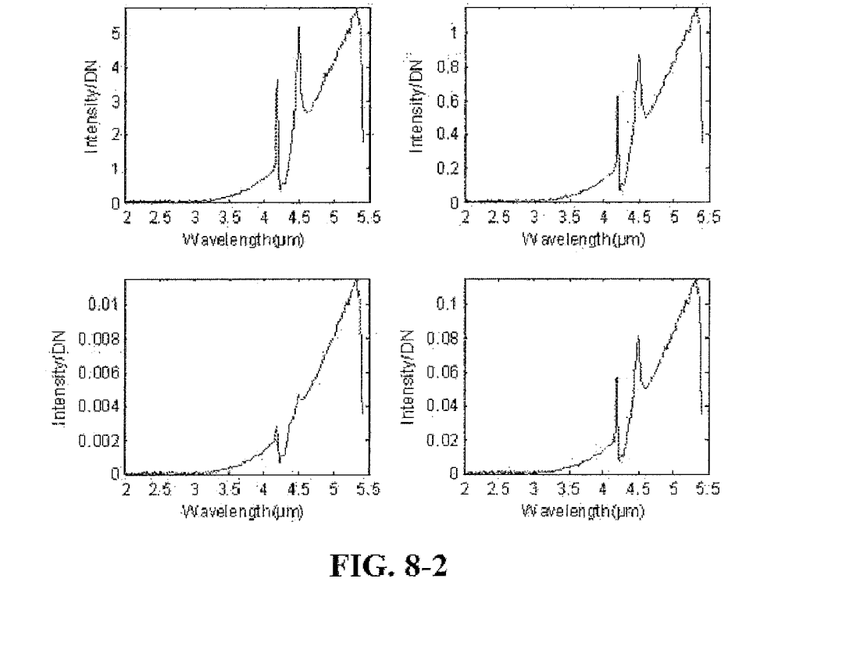

FIG. 8-1 is an infrared result of performing continuous tracking measurement on the moving target within a plurality of continuous measurement periods, and FIG. 8-2 is an infrared spectrum measurement result in the above corresponding situation. It can be seen from the experimental data result that the intensity of the spectral feature of the tail flame of the aircraft is weakened with the increasing detection distance, while the major spectral trend feature still remains substantially unchanged, which provides a data basis for identifying the target from the background subsequently. As can be seen, along with the growing distance of the aircraft, the spectral radiation intensity of the aircraft is gradually decreased, but the main wave peaks, wave troughs, and curve trend of the spectrum remain substantially consistent, which provides a solid data basis for subsequent target identification. The above figures all illustrate the superiority and progressiveness of the image-spectrum associated measurement system and method according to the automatic control strategy in which the information entropy is optimized.

It is easy for a person skilled in the art to understand that, the above merely gives preferred embodiments of the present invention, and is not intended to limit the present invention. Any modification, equivalent replacement, improvement and the like made within the spirit and principle of the present invention shall fall within the protection scope of the present invention.

The invention claimed is:

1. A multiband common-optical-path image-spectrum associated remote sensing measurement system, wrapped by a protective shell, wherein the system comprises:
an infrared window (1), a two-dimensional rotating mirror (2), a planar reflector (3), a reflective multiband infrared lens system (4), a Fourier interference spectrum module (5), an image-spectrum associated processing module (6), a power supply module (7), a refrigerating module (8), and a display module (9);
the infrared window (1) is connected to the shell, through which the infrared light in a target scene passes;
the two-dimensional rotating mirror (2) is fixedly installed inside the shell, a center of the two-dimensional rotating mirror (2) coincides with a central axis of a field of view of the infrared window (1), a mirror plane of the two-dimensional rotating mirror (2) is placed to form an angle of 45° with the central axis of the field of view of the infrared window (1), for tracking a moving target in the target scene, and achieving local-region and multi-target sampling;
the center of the planar reflector (3) and the center of the two-dimensional rotating mirror (2) are on the same horizontal height, the mirror plane of the planar reflector (3) is parallel to the mirror plane of the two-dimensional rotating mirror (2);
the central axis of the reflective multiband infrared lens system (4) coincides with the center of the planar reflector (3), for focusing the multiband infrared light, and achieving common-optical-path imaging and spectrum measurement;
an optical signal input end of the Fourier interference spectrum module (5) is connected to the reflective multiband infrared lens system (4), an electrical signal output end of the Fourier interference spectrum module (5) is connected to the image-spectrum associated processing module (6), for acquiring infrared spectrum data;
the image-spectrum associated processing module (6) is connected to the reflective multiband infrared lens system (4), for realizing image-spectrum associated processing; and
the power supply module (7), the refrigerating module (8), and the display module (9) are respectively connected to the image-spectrum associated processing module (6).

2. The remote sensing measurement system of claim 1, wherein, the two-dimensional rotating mirror (2) comprises a planar reflector (21), a two-dimensional turntable (22), and a servo motor (23);
the planar reflector (21) is placed on the two-dimensional turntable (22), and is fixed through a card slot on the turntable; two drive shafts of the servo motor (23) are mechanically connected to a pitching axis and a rotation axis of the two-dimensional turntable (22) respectively.

3. The remote sensing measurement system of claim 1, wherein, the reflective multiband infrared lens system (4) comprises a lens body (41), a spectroscope (42), an infrared detector (43), and an infrared optical fiber coupler (44);
the center of the mirror plane of the spectroscope (42) coincides with the central axis of the lens body (41), the mirror plane of the spectroscope (42) forms an angle of 45° with the central axis; the infrared detector (43) is mounted at the tail, the center of the infrared detector (43) and the central axis are arranged in a straight line; and the infrared optical fiber coupler (44) is disposed at the edge of the tail.

4. The remote sensing measurement system of claim 3, wherein, the image-spectrum associated processing module (6) comprises: a communication level switch unit (61), an image processing unit (62), a system control unit (63), a spectrum processing unit (64), and a data merging total control unit (65);
the communication level switch unit (61) is connected to the infrared detector (43) of the reflective multiband infrared lens system (4) via an RS422 interface, for realizing level switch between modules;
one end of the image processing unit (62) is connected to the infrared detector (43) via an image interface, the other end of the image processing unit (62) is connected to the data merging total control unit (65), for performing image enhancement, feature extraction, and segmentation processing on the collected infrared image, and realizing system tracking;
an input end of the system control unit (63) is connected to the communication level switch unit (61), a control end of the system control unit (63) is connected to the data merging total control unit (65), an output end of the system control unit (63) is connected to the two-dimensional rotating mirror (2), for performing motion control over the two-dimensional rotating mirror (2) via a serial port;
an input end of the spectrum processing unit (64) is connected to an electrical signal output end of the Fourier interference spectrum module (5), an output end of the spectrum processing unit (64) is connected to the data merging total control unit (65), for performing collection control, data preprocessing, radiometric calibration, and spectrum feature extraction processing on the infrared spectrum collected by the Fourier interference spectrum module (5); and
the data merging total control unit (65) is configured to perform data merging processing on the output of the image processing unit (62), the system control unit (63), and the spectrum processing unit (64), and select an optimal system control strategy for performing data collection according to the processing result.

5. A measurement method based on the multiband common-optical-path image-spectrum associated remote sensing measurement system of claim 1, comprising the following steps:
(1) achieving full-field of view scanning collection in a target scene by an infrared detector to obtain an image sequence;
(2) extracting at least one region of interest in the image sequence;
(3) calculating a feature description matrix of all regions of interest in the image sequence;
(4) judging whether the current time is in a data acquisition initial stage, if so, giving an initial value to the feature weight matrix of all the regions of interest; and if not, performing successive matching correlation between all the regions of interest in the image sequence and all the regions of interest acquired in the previous collection period according to the feature description matrix of all the regions of interest, extracting a spectrum feature of each region of interest correlated successfully, adding the spectrum feature into the feature description matrix of the corresponding region of interest, and meanwhile duplicating the feature weight matrix thereof to the feature weight matrix of the corresponding regions of interest;
(5) calculating a feature information entropy of all the regions of interest, sorting the corresponding regions of interest according to the values of the feature information entropy ranging from large to small, and giving serial numbers of a collection sequence to all the regions of interest;
(6) sorting collection points in all the regions of interest in sequence according to the serial numbers so as to form a collection point sequence;
(7) sequentially moving an optical axis point to the collection points in the collection point sequence; meanwhile using a non-imaging Fourier interference spectrum module to acquire spectrum data of the regions of interest; and
(8) repeating steps (1) to (7) to go on with the next collection period, until the system collection is over.

6. The measurement method of claim 5, wherein, in the step (2), the region of interest refers to several closely connected pixel points in an image, and the extracting the region of interest specifically comprises:
(21) performing image enhancement processing by means of a non-linear visual principle;
(22) performing image segmentation processing on the image on which the enhancement processing has been performed; and
(23) performing dilation and erosion processing on the image on which the segmentation processing has been performed so as to acquire the region of interest.

7. The measurement method of claim 5, wherein, in the step (3), the feature description matrix of the regions of interest comprises a position feature, a shape feature, a gray feature, and a spectrum feature; the position feature comprises a collection point coordinate $$\left(x_c = \frac{\sum_{i=1}^{M} x_i}{M}, y_c = \frac{\sum_{i=1}^{M} y_i}{M}\right),$$

a boundary chain $(c_1, c_2, \ldots, c_n)$, and a collection distance $L=|x_c-x_0|+|y_c-y_0|$; the region of interest $RGN_V$ comprises M pixel points $(x_1,y_1), (x_2,y_2), \ldots, (y_M,y_M)$, n is the number of pixel points at the boundary of the region of interest, $c_i=(x_i,y_i)$ is the pixel point at the boundary of the region of interest; and $(x_0,y_0)$ is a current optical axis point, and the position thereof is constantly changed along with the movement of the two-dimensional rotating mirror;

the shape feature comprises an area A and a perimeter $P=|\partial(RGN_V)|$ of the region of interest; wherein the area A=M, and the perimeter P is equal to the length of the region of interest $RGN_V$;

the gray feature comprises an average gray $$I = \frac{\sum_{i=1}^{M} f(x_i, y_i)}{M},$$

a gray gradient matrix, and an average gradient; wherein the $f(x_i,y_i)$ represents a gray value of the image at the pixel point $(x_i,y_i)$; and the spectrum feature includes a spectrum curve change trend, positions of wave peaks and wave troughs, the number of wave peaks greater than a mean value, the number of wave peaks less than the mean value, the number of wave troughs greater than the mean value, the number of wave troughs less than the mean value, a peak width, and a peak height.

* * * * *